United States Patent [19]
Brabandt

[11] Patent Number: 5,809,531
[45] Date of Patent: Sep. 15, 1998

[54] COMPUTER SYSTEM FOR EXECUTING PROGRAMS USING AN INTERNAL CACHE WITHOUT ACCESSING EXTERNAL RAM

[75] Inventor: Earl W. Brabandt, Hillsboro, Oreg.

[73] Assignee: Intel Corporation, Santa Clara, Calif.

[21] Appl. No.: 403,579

[22] Filed: Mar. 14, 1995

Related U.S. Application Data

[63] Continuation of Ser. No. 222,190, Apr. 1, 1994, abandoned, which is a continuation of Ser. No. 948,405, Sep. 21, 1992, abandoned.

[51] Int. Cl.⁶ ............................................. G06F 13/00
[52] U.S. Cl. ........................... 711/141; 395/651; 395/559
[58] Field of Search ............................. 711/3, 123, 125, 711/126, 141, 118; 395/559

[56] References Cited

U.S. PATENT DOCUMENTS

| | | | |
|---|---|---|---|
| 4,195,341 | 3/1980 | Joyce et al. | 364/200 |
| 4,493,026 | 1/1985 | Olnowich | 364/200 |
| 4,667,288 | 5/1987 | Keeley et al. | 364/200 |
| 4,669,043 | 5/1987 | Kaplinsky | 364/200 |
| 4,794,524 | 12/1988 | Carberry et al. | 364/200 |
| 4,905,188 | 2/1990 | Chuang et al. | 364/900 |
| 5,025,366 | 6/1991 | Baror | 364/200 |
| 5,031,141 | 7/1991 | Guddat et al. | 365/49 |
| 5,113,508 | 5/1992 | Groves et al. | 364/DIG. 1 |
| 5,131,083 | 7/1992 | Crawford et al. | 395/275 |
| 5,136,691 | 8/1992 | Baror | 364/DIG. 1 |
| 5,185,879 | 2/1993 | Yamada et al. | 364/DIG. 1 |
| 5,239,639 | 8/1993 | Fischer et al. | 395/425 |
| 5,263,153 | 11/1993 | Intrater et al. | 395/575 |
| 5,274,787 | 12/1993 | Hirano et al. | 395/425 |
| 5,285,323 | 2/1994 | Hetherington et al. | 395/425 |

OTHER PUBLICATIONS

System Interface of the N532532 Microprocessor by Sidi et al, pp. 232–235, 1988.

Intel i860™ XP Microprocessor Data Book Table of Contents and pp. 41–47; Publication Date: May 1991.

*Primary Examiner*—Emanuel Todd Voeltz
*Assistant Examiner*—Michael T. Richey
*Attorney, Agent, or Firm*—Blakely, Sokoloff, Taylor & Zafman

[57] ABSTRACT

A method is disclosed for implementing a processing environment for a processor having an on-chip cache such that a functional external memory subsystem is not required. The on-chip cache is initialized upon start-up of the processor, which is coupled to a boot-up read only memory (ROM), such that each line in each way of the on-chip cache is driven to the same known state of the cache consistency protocol implemented by the on-chip cache. The on-chip cache is loaded with dummy data through the use of a ready signal generator, which ends the wait state of the processor allowing the processor to proceed with loading although no valid data exists. Regardless of the validity or contents of the dummy data, the on-chip cache will be driven to the known state without resorting to the external memory subsystem. The on-chip cache may then be used as a memory device for use with client programs contained in the boot-up ROM. Execution of the client programs can proceed without a functional external memory subsystem.

11 Claims, 3 Drawing Sheets

COMPUTER SYSTEM FOR EXECUTING PROGRAMS USING AN INTERNAL CACHE WITHOUT ACCESSING EXTERNAL RAM

This is a continuation of application Ser. No. 08/222,190, filed Apr. 1, 1994 now abandoned, which is a continuation of application Ser. No. 07/948,405, filed Sep. 21, 1992 now abandoned.

BACKGROUND OF THE INVENTION

1. Field of the Invention

The present invention relates generally to microprocessors and more specifically to microprocessors with on-chip caches.

2. Art Background

It is common for a microprocessor system to require random-access memory (RAM) external to the microprocessor for the storage of program data because, unlike microcontrollers, a microprocessor typically does not provide an integrated on-chip memory sufficient to provide stand-alone capability. As a result, even simple programs depend on a functional external memory subsystem for effective operation. The expense, physical size, power requirement and reliability of an external memory subsystem, however, often compromise the overall performance of the microprocessor itself. This has prompted the elimination of the memory subsystem as a necessary functional block in system and program design. Although many modern microprocessors feature integrated on-chip cache memories to improve system performance, the dependency of a functional external RAM is not completely alleviated.

The need to access external RAM subsystems usually arises simply because a microprocessor with an on-chip cache memory is designed with an external memory in mind. Therefore, some external memory's bus cycles are always driven after the microprocessor is released from the reset state and no programmable means is available to initialize the on-chip cache without selecting and using the external RAM sub-system. The on-chip cache memory must first be initialized with RAM reads to satisfy the initial cache line misses that occur before a 100% cache hit rate may be achieved. If a failure in the DRAM subsystem occurs during this initialization, the system is likely to crash.

Therefore, it is desirable to create a system that eliminates or reduces the dependency upon the functional external RAM subsystem in systems using microprocessors with on-chip cache memories. Once an environment is created in a microprocessor system, it supports the execution of many client programs such as diagnostics, monitors, de-buggers and embedded controllers that can be developed using conventional programming tools and languages well-known to those skilled in the arts.

Such an environment can be particularly beneficial to system diagnostic programs useful in diagnosing faults in the system. In general, the usefulness of a diagnostic program is limited by the amount of functional hardware necessary to run the diagnostic; a program is inherently ineffective at diagnosing faults that affect the operation of the program itself. Therefore, it is desirable to have such a system which completely eliminates the contingency of a functional external RAM memory and a large complex and relatively unreliable associated control logic. A ROM-based environment will suit the system's diagnostic programs particularly well because it allows the diagnostic programs to execute effectively despite faults in the RAM memory and control logic. Another example of the client programs for such a system can be found in embedded controller systems, which do not require a large amount of memory but include a RAM system only because current microprocessor hardware and software designs require it.

Furthermore, despite the limitations imposed by microprocessors, system designs requiring only a small external boot ROM and a small section of reliable boot logic are possible if the system hardware and software are designed to accommodate a useful on-chip cache initialization.

The present invention provides a method of internally initializing the on-chip cache of a microprocessor, which eliminates the need for an external memory for program code or data storage. Rather than decoding a region of address space to select the RAM memory during system initialization, an address space is decoded to select only a ready signal generator. No external memory port or device is actually accessed during a cycle to ready generator address space. The ready generator is designed to produce an active ready signal consistent with the microprocessor cycle generated.

SUMMARY OF THE INVENTION

Therefore, it is an object of the present invention to provide a microprocessor with an on-chip cache with no dependency upon external RAM subsystem during power-up.

It is also an object of the present invention to provide a microprocessor with an on-chip cache capable of performing internal initialization.

It is further an object of the present invention to provide a microprocessor with an on-chip cache capable of operating RAM-independent client programs such as diagnostic, monitor, de-bugger, and embedded controller programs.

A method of internally initializing an on-chip cache of a processor upon start-up of the processor is disclosed. The method comprises the steps of initializing a first register variable with a predetermined address in an address space corresponding to a ready generator. A first way in the on-chip cache is enabled to make the cache replacement scheme deterministic. All lines in the first way of the on-chip cache are invalidated. The predetermined address is issued by the processor to initiate a dummy load by the cache. The predetermined address is decoded to determine if it selects the address space corresponding to the ready signal generator and if so, a select signal is generated to the ready generator. A ready signal is returned by the ready signal generator to the processor after receiving the select signal from the address decoder. A dummy load of a plurality of predetermined addresses contained in the first register variable is performed to initialize a tag of a set in the way by filling the first way, the dummy load causing a line corresponding to each of the plurality of predetermined addresses to be in a known state according to the predetermined cache consistency protocol. And the steps of enabling the first way in the on-chip cache and performing a dummy read for a second way are repeated until all lines in all ways in the on-chip cache are in the known state according to the predetermined cache consistency protocol.

BRIEF DESCRIPTION OF THE DRAWINGS

The objects, features and advantages of the present invention will become apparent to one skilled in the art from reading the following detailed description in which.

DETAILED DESCRIPTION OF THE INVENTION

A method of and apparatus for internally initializing an on-chip memory of a microprocessor is disclosed. In the following description, numerous specific details are set forth in order to provide a thorough understanding of the present invention. It will be obvious, however, to one skilled in the art that these details are not required to practice the present invention. In other instances, well-known circuits, methods and the like are not set forth in detail in order to avoid unnecessarily obscuring the present invention.

Figure 1:
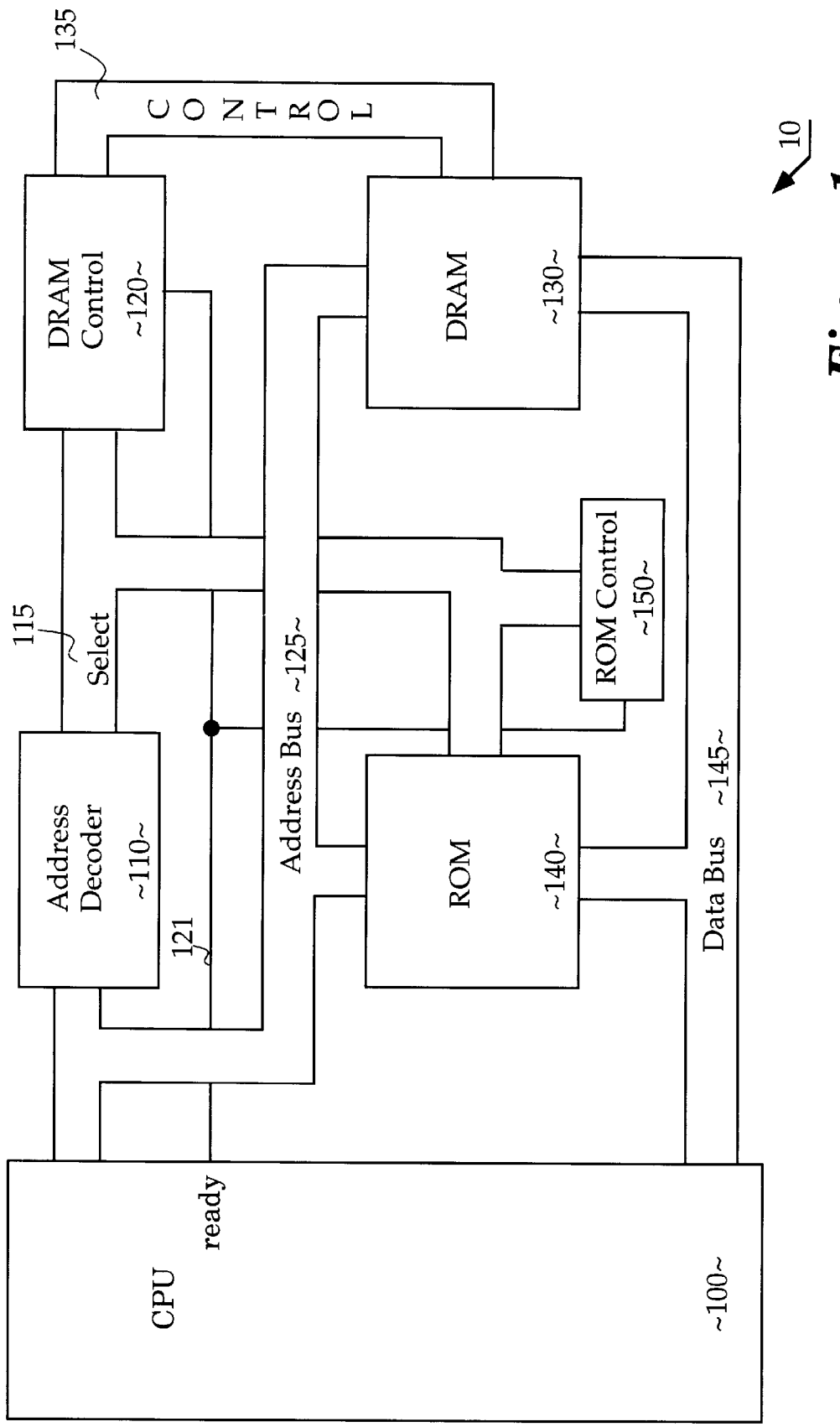
FIG. 1 is a block diagram of a RAM-dependent hardware design in the prior art.

FIG. 1 is a block diagram of a RAM-dependent hardware design in the prior art. Referring to FIG. 1, system 10 comprises CPU 100, address decoder 110, DRAM controller 120, DRAM 130, Read-Only Memory (ROM) 140 and ROM controller 150. Typically, during CPU 100 start-up, an address is transferred from CPU 100 to address decoder 110 to generate proper select signals. The select signals are transferred to either DRAM controller 120 or ROM controller 150 through select bus 115. The address is also transferred through address bus 125 to either ROM 140 or DRAM 130 to access the data associated with that address for transmission to CPU 100 through data bus 145. Upon CPU 100 start-up, ready signal 121 is returned from DRAM controller 120 to CPU 100 when DRAM 130 can respond to CPU 100. For example, when CPU 100 places an address on address bus 125, CPU 100 is temporarily placed in a wait state until the DRAM 130 is ready to respond to CPU 100 by returning ready signal 121. Control bus 135 typically transfers signals such as row address strobe (RAS), column address strobe (CAS), write and read enables, write/read, and burst/non-burst. As will be appreciated by those skilled in the art, although these control signals are implemented to improve the performance of CPU 100, at the same time they increase the complexity of the system 10. Furthermore, when one of those external features fails, system 10 malfunctions preventing CPU 100 from running even the simplest diagnostic program due to the external failures.

Figure 2:
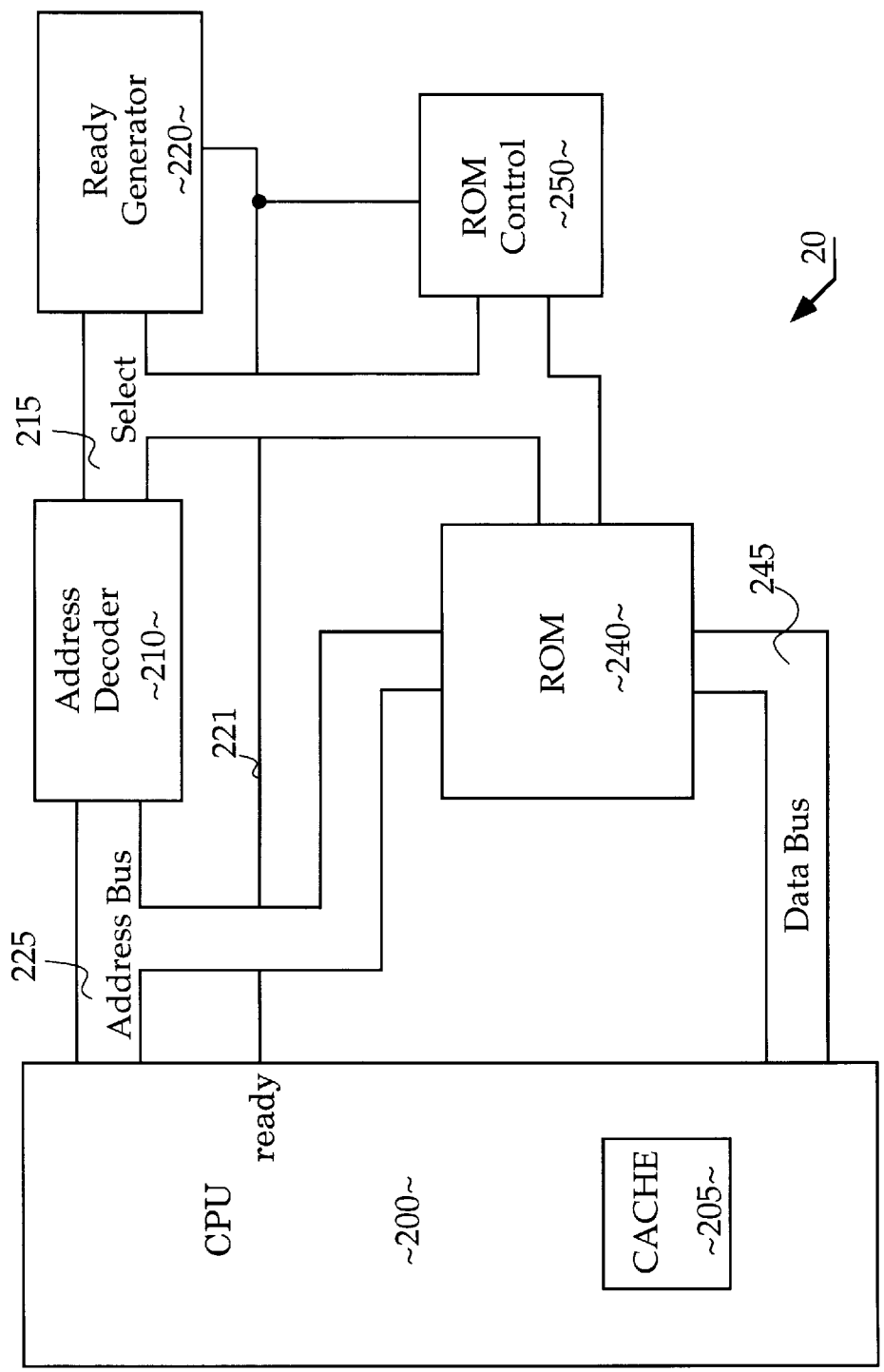
FIG. 2 is a RAM-independent hardware design in accordance with the teaching of the present invention.

Reference is now made to FIG. 2, where a RAM-independent hardware design in accordance with the teaching of the present invention is illustrated. FIG. 2 illustrates system 20 comprising CPU 200, address decoder 210, ready generator 220, ROM 240 and ROM controller 250. Address bus 225 transfers addresses between CPU 200, address decoder 210 and ROM 240. Select bus 215 transfers select signals between address decoder 210, ready generator 220, ROM 240 and ROM controller 250. Ready generator 220 returns ready signal 221 to CPU 200. Data bus 245 connects between CPU 200 and ROM 240.

As will be described in the following, a microprocessor system in accordance with the teaching of present invention will be able to generate its basic functionality despite the failures in the external memory subsystem or the nonexistence of a memory subsystem. CPU 200 is currently implemented in Intel i860™ XP microprocessor with an on-chip cache (not shown), which implements a cache consistency protocol known as MESI, i.e., Modified, Exclusive, Shared and Invalid, representing the four states of the cache line at any given time. Also, the on-chip cache implements a test mode, allowing one way/block of the cache to be enabled/ selected, while disabling/de-selecting other ways of the cache. For further information about the i860™ XP microprocessor and its on-chip cache, reference to the i860™ XP microprocessor can be found in a data book available from Intel Corporation, Santa Clara, Calif. Those skilled in the art will appreciate that other microprocessors with on-chip storages operating a consistency protocol can also benefit from the teaching of the present invention, as long as writing to the lines in the on-chip storage can be done without also generating an external write to the bus.

Ready generator 220 is typically implemented in a timing circuit which is activated when an address from CPU 200 is correctly decoded to access ready generator 220. When ready generator 220 is activated, a ready signal 221 is returned to CPU 200 terminating CPU's wait state and providing a mechanism to initialize the on-chip cache as will be described herein.

Figure 3:
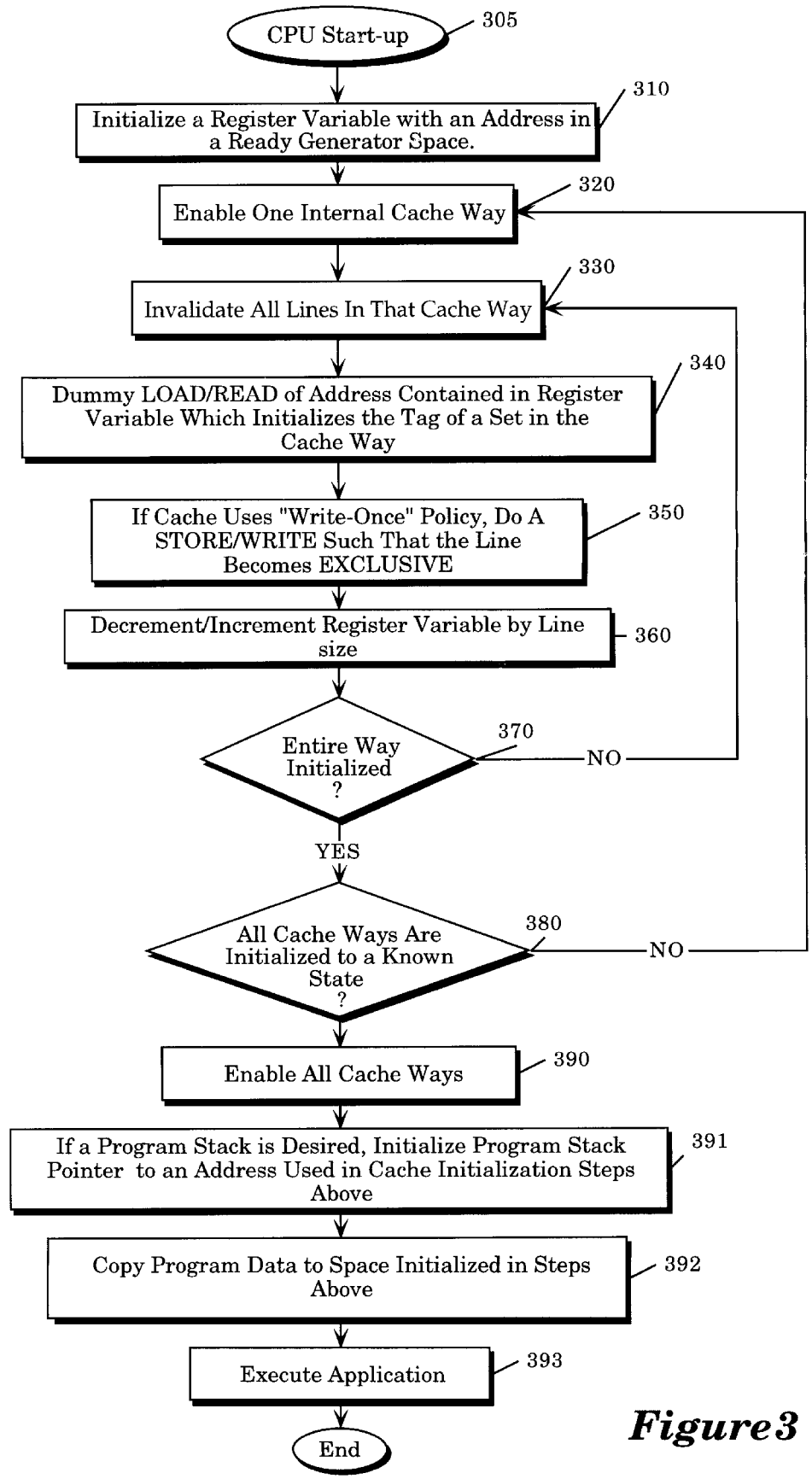
FIG. 3 is a flow chart of the method of internally initializing the on-chip cache of the microprocessor in accordance with the present invention.

Reference is now made to FIG. 3, where the method of internally initializing the on-chip cache of the microprocessor in accordance with the present invention is illustrated in a flow chart. Upon CPU start-up 305, a register variable is initialized with an address mapping to the ready generator 310. The CPU enables one way/block, or a predetermined number of ways depending upon the specific system, of the internal cache through a test mode of the cache 320. The CPU then invalidates all lines within that way/block of the internal cache 330. It should be noted that some microprocessors provide a FLUSH instruction to invalidate the lines in the cache, while others perform a write to a cache control register to invalidate the lines; however, it should be appreciated by those skilled in the art that there are other implementations which do not require the test mode or line invalidation step if the cache can be filled deterministically with a method of cache line replacement on a write-back cycle or eviction cycle.

After all the lines in the way are invalidated 330, the CPU performs a dummy load of the address in the register variable 340, whereby an address is issued to select the ready generator, which returns a ready signal to the CPU when selected, terminates the cycle and initializes the tag of the selected set in the enabled cache way. The dummy load has the effect of initializing the tag for the set selected by the address to result in a hit for all subsequent references to this address. It should be appreciated by those skilled in the art that the address can be initially encoded in the ROM. As a result of the load, the CPU does a cycle externally on its pins to bring in data while in fact there is no valid data available for the CPU. However, regardless of the validity of the data, the CPU can continue its operations since its wait state is now terminated by the received ready signal. As a result, the CPU can drive the internal cache to a known state, such as a SHARED state according to the MESI consistency protocol, for that particular line. For a cache using "write-once" update policy, the CPU does a STORE such that the line is now EXCLUSIVE, according to the MESI consistency protocol 350. The CPU then decrements or increments the register variable by an appropriate line size dependent upon the design of the system to initialize all the lines in the entire way by repeating the dummy load process for all the lines in that way 360.

After each way, the register variable is further decremented or incremented by the appropriate line size to select another way 380. In another way, the same process is repeated until all the ways are initialized to a known state 390 for subsequent use. It should be appreciated by those skilled in the art that once all the ways in the on-chip cache are initialized, the processor's dependence upon the external functional hardware, such as the DRAM, has been completely avoided.

It should be noted that this process allows the CPU to fill all the lines in each way of the cache through a range of physical addresses in a controlled manner. As a result, the cache lines become deterministic and can be used just as a memory such as a scratch pad memory or static RAM, thus obviating the need for the CPU to go to external memory sub-systems and avoiding the problems caused by aforementioned external memory failures. As shown in FIG. 3, after the cache is initialized to a known state, all cache ways can now be enabled for further use 390. For example, a program stack memory can be used after the stack pointer is initialized to the address used before 391. Program data can then be copied into the initialized space for execution 392, 393.

A microprocessor system implementing the internal on-chip cache initialization method will no longer rely upon an external DRAM, which needs to be functional to prevent the program from crashing. As a result, the codes stored in the ROM can run with very little external hardware. While such internal initialization process results in the cache memory being filled with non-valid data from a floating (tri-state), or unknown, data bus, it provides a mechanism to drive the internal cache lines to the "modified" state of the MESI consistency protocol, or other appropriate valid state, with very little external functional hardware. Subsequent program cycles to the ready generator address space can thus result in cache hits without resulting in externally driven cycles. The cycles are entirely satisfied by the on-chip cache memory. A diagnostic program may also use the cache memory for temporary storage of stack variables or the storage of data copied from the boot ROM without reliance upon the external DRAM. Additionally, if a program stack is desired, the program stack counter can be initialized to an address used in the cache initialization method of the present invention. Program data can then be copied, possibly from ROM, to the space already initialized for execution.

I claim:

1. A computer system comprising:
    an address bus;
    a data bus;
    a ready signal line for carrying a ready signal;
    a ready signal generator means coupled to the ready signal line for immediately and automatically asserting the ready signal, regardless of the existence of functioning system memory coupled to the data bus, when the ready signal generator means is selected;
    an address decoder means coupled to the address bus for receiving an address, the address decoder means selecting the ready signal generator means when the address corresponds to the ready signal generator means; and
    a processor means coupled to the address bus, the data bus, the ready signal line, the ready signal generator means, and the address decoder means, the processor means including an internal cache, the processor means filling the internal cache with ostensibly valid data by supplying a first address to the address decoder to select the ready signal generator means wherein the processor means loads dummy data from the data bus into the internal cache in response to the ready signal generator means asserting the ready signal, the dummy data comprising existing values on the data bus wherein no system component coupled to the data bus drives the dummy data, the processor means operating according to a cache consistency protocol for indicating that the dummy data loaded into the internal cache is valid and available for access.

2. The computer system of claim 1 further comprising:
    a read only memory (ROM) coupled to the data bus, wherein the ROM stores a program;
    ROM control means coupled to the address decoder and the ready signal line, the ROM control means for asserting the ready signal line when the data of the program stored by the ROM is available for output to the data bus in response to the ROM control means being selected by the address decoder, wherein the address decoder means selects the ROM control means in response to the processor means issuing a second address.

3. The computer system of claim 1 wherein the processor means is for loading the program into the internal cache and for executing the program.

4. In a computer system having a processor that includes an internal cache, a method for filling the internal cache with ostensibly valid data comprising the steps of:
    the processor generating an address signal that indicates a ready signal generator;
    an address decoder selecting the ready signal generator in response to the address signal;
    the ready signal generator immediately and automatically generating a ready signal in response to being selected regardless of the existence of functioning system memory coupled to the data bus; and
    the processor loading dummy data into the internal cache in response to generation of the ready signal by the ready signal generator, the dummy data comprising existing values on the data bus wherein no system component coupled to the data bus drives the dummy data, the processor operating according to a cache consistency protocol for indicating that the dummy data loaded into the internal cache is valid and available for access.

5. The method of claim 4 further comprising the step of the processor invalidating all lines of the internal cache before the processor generates the address signal.

6. In a computer system having a processor that includes an internal cache, a method comprising the steps of:
    the processor generating a first address signal that indicates a ready signal generator;
    an address decoder selecting the ready signal generator in response to the first address signal;
    the ready signal generator immediately and automatically asserting a ready signal in response to being selected regardless of the existence of functioning system memory coupled to the data bus;
    the processor loading dummy data into the internal cache in response to generation of the ready signal by the ready signal generator, the dummy data comprising existing values on the data bus wherein no system component coupled to the data bus drives the dummy data, the processor operating according to a cache consistency protocol for indicating that the dummy data loaded into the internal cache is valid and available for access;
    the processor generating a second address signal that indicates a read only memory (ROM);
    the address decoder selecting a ROM controller in response to the second address signal;
    the ROM controller asserting the ready signal in response to the data of the ROM being available for output; and the processor loading the data of the ROM into the internal cache in response to the ROM controller asserting the ready signal.

7. The method of claim 6 further comprising the step of the processor invalidating all lines of the internal cache before the processor generates the address signal.

8. The method of claim 6, wherein the data loaded into the internal cache from the ROM comprises a program, the method further comprising the step of the processor executing the program.

9. A computer system comprising:

an address bus;

a data bus;

a ready signal line carrying a ready signal;

a ready signal generator coupled to the ready signal line, the ready signal generator immediately and automatically asserting the ready signal, regardless of the existence of functioning system memory coupled to the data bus, when the ready signal generator is selected;

an address decoder coupled to the address bus; and a processor coupled to the address bus, the data bus, the ready signal line, the ready signal generator, and the address decoder, the processor including an internal cache, the processor configured to fill the internal cache with ostensibly valid data by supplying a first address to the address decoder to select the ready signal generator wherein the processor is configured to load dummy data from the data bus into the internal cache in response to the ready signal generator asserting the ready signal, the dummy data comprising existing values on the data bus wherein no device coupled to the data bus drives the dummy data, the processor configured to operate according to a cache consistency protocol to indicate that the dummy data loaded into the internal cache is valid and available for access.

10. The computer system of claim 9 further comprising:

a read only memory (ROM) coupled to the data bus, wherein the ROM stores a program; and a ROM control circuit coupled to the address decoder and the ready signal line, the ROM control circuit for asserting the ready signal line when the data of the program stored by the ROM is available for output to the data bus in response to the ROM control circuit being selected by the address decoder, wherein the address decoder selects the ROM control in response to the processor issuing a second address.

11. The computer system of claim 10 wherein the processor loads the program into the internal cache and executes the program.

* * * * *